United States Patent
Young et al.

[11] Patent Number: 6,119,981
[45] Date of Patent: Sep. 19, 2000

[54] DROGUE ASSEMBLY FOR IN-FLIGHT REFUELLING

[75] Inventors: Roy Gerald Seymour Young, Bournemouth; David Percy Anstey, Christchurch, both of United Kingdom

[73] Assignee: Flight Refuelling Limited, Dorset, United Kingdom

[21] Appl. No.: 09/390,368

[22] Filed: Sep. 7, 1999

Related U.S. Application Data

[63] Continuation of application No. PCT/GB98/00560, Mar. 4, 1998.

[30] Foreign Application Priority Data

Mar. 4, 1997 [GB] United Kingdom .................. 9704472

[51] Int. Cl.[7] ........................................ B64D 37/00
[52] U.S. Cl. .......................................... 244/135 A
[58] Field of Search ................................. 244/135 A

[56] References Cited

U.S. PATENT DOCUMENTS

| | | | |
|---|---|---|---|
| 2,823,881 | 2/1958 | Patterson | 244/135 A |
| 2,946,543 | 6/1960 | Gordon et al. | 244/135 A |
| 2,960,291 | 11/1960 | Patterson | 244/135 A |
| 2,998,949 | 9/1961 | Patterson | 244/145 |
| 3,011,742 | 12/1961 | Gross | 244/135 A |
| 3,048,357 | 8/1962 | Loedding | 244/135 |
| 3,108,769 | 10/1963 | Hieber | 244/135 A |
| 4,927,099 | 5/1990 | Emerson et al. | 244/152 |
| 5,255,877 | 10/1993 | Lindgren et al. | 244/135 A |
| 5,427,333 | 6/1995 | Kirkland | 244/135 A |

FOREIGN PATENT DOCUMENTS

| | | | |
|---|---|---|---|
| 211885 | 9/1955 | Australia | 244/135 A |

OTHER PUBLICATIONS

International Search Report dated May 25, 1998 (1 page).

*Primary Examiner*—Peter A. Nelson
*Attorney, Agent, or Firm*—Finnegan, Henderson, Farabow, Garrett & Dunner, L.L.P.

[57] ABSTRACT

A drogue assembly comprises a circumferential array of triangular support arms. Each support arm is pivoted and mounted on a pivot pin at its apex for swinging movement in a radial direction. Each juxtaposed pair of support arms is joined together by a net which is joined to each of those support arms at spaced intervals therealong. The support arms carry a drogue parachute which extends circumferentially around their shortest sides.

9 Claims, 3 Drawing Sheets

DROGUE ASSEMBLY FOR IN-FLIGHT REFUELLING

This application is a continuation of International Application No. PCT/GB98/00560, filed Mar. 4, 1998, the content of which is incorporated herein by reference.

This invention relates to a drogue assembly for in-flight refuelling.

Drogues are used to stabilise refuelling hose trailing from a tanker aircraft in a generally horizontal attitude. They provide drag for a refuelling coupling at the trailing end of the refuelling hose which is to be coupled for in-flight refuelling with a probe from a following aircraft which is to be refuelled. This drag resists the forward movement of the probe.

A known form of drogue assembly for in-flight refuelling comprises a circumferential array of support arms, each pivotally mounted on a respective pivot pin, the pivot pins being arranged in a ring from which the support arms extend in one direction which is generally parallel to an axis with which the array is concentric, each support arm being mounted so as to be pivotable in a direction which is radial with respect to said axis, each support arm being generally triangular and being pivotally mounted by an apex thereof, the side of each generally triangular support arm nearer to the axis being longer and the side remote from the ring being shorter than the third side, and a drogue parachute which is fitted to the shorter sides of the support arms, the arrangement being such that the support arms with the drogue parachute thereon can be collapsed within a cylindrical envelope having a diameter which is approximately that of the ring of pivot pins, whereas the drogue assembly is towed by an aircraft in flight, being extended in the manner of a parachute with the support arms flared outwardly from the axis, trailing the ring of pivot pins.

If tie wires, each having a retaining ball at either end, are provided for limiting the circumferential spacing between adjacent support arms of the circumferential array, there is a risk of engine damage should such tie wires break, as the broken tie wire pieces may be dislodged from the drogue assembly and drawn into an engine air intake. This problem can be reduced, but not eliminated, by providing each tie wire with a third retaining ball between its ends so only part of the wire with a single ball may be dislodged in the event of a break.

One object of this invention is to provide a drogue assembly of the kind referred to above with means for limiting the circumferential spacing of the support arms which is unlikely to break into pieces which may be dislodged from the assembly.

According to this invention there is provided a drogue assembly of the kind referred to above, wherein each adjacent pair of support arms are joined together by a net.

Preferably each net is joined to a respective support arm at spaced intervals along the latter. Each joint may comprise a loop of the net material which is retained within a respective aperture in the support arm. The apertures may be in a row, adjacent apertures being interconnected by respective elongate passages which are in line and the loops being retained within their respective apertures by a common pin which is inserted into the aligned passages so that it bridges each of the apertures wherein it is threaded through the respective loop so that the net is joined to the support arm by the pin which is threaded through the row of loops and which is retained within the aligned passages. Preferably each loop of net material is wound circumferentially around a reel through which the pin extends, the reel being entrapped within the net by the loop that is wound around it. Conveniently the reel is flanged at either end so that it forms an annular channel within which the cord material wound therearound is received. There may be an arcuate link formed integrally with the remainder of the reel and joined at either end to a respective one of the flanges so as to cooperate with the flanges to form an aperture through which the net material wound around the reel is passed.

In a preferred embodiment of this invention, each support arm is provided with a hook element at either end of its shortest side, each hook element facing the other and receiving the respective edge portion of the drogue parachute which is retained therein by retaining means fitted therein, whereby the drogue parachute is fitted to the circumferential array of support arms.

Preferably the retaining means comprise a strap element which is enlarged at its free end and which is joined to the outer surface of the respective hook element, the enlarged end being a sliding fit within the hook cavity.

One form of drogue assembly in which this invention is embodied is described now by way of example with reference to the accompanying drawings, of which:

FIG. 4 is a fragmentary view in the direction of arrow IV in FIG. 2.

Figure 1:
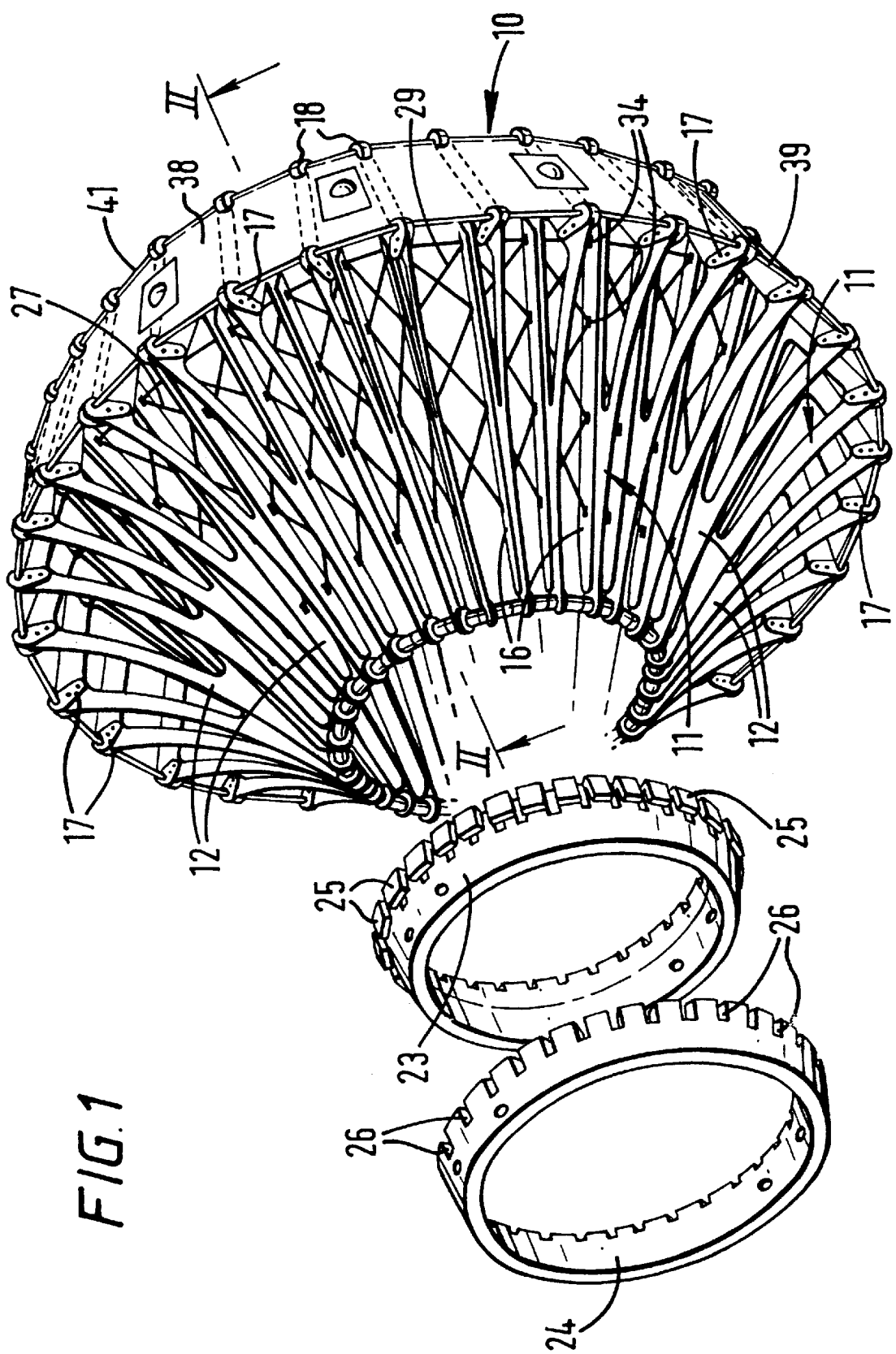
FIG. 1 is a general view in perspective of a drogue assembly, with its clamping rings shown separately, displaced therefrom.

The drawings show a drogue assembly 10. The drogue assembly 10 comprises a circumferential array of support arms 11. Each support arm 11 comprises a generally triangular metal frame 12 having a short side 13 and two longer sides 14 and 15. One, 14, of those longer sides, which is a little longer than the other longer side 15, is disposed radially inwardly with respect to that other side 15 and is fitted into the channel of a metal channel section member 16. There is a clearance between the edge of the frame 12 within the channel and the base of that channel. The frame 12 is rivetted to the channel section member 16. The short side 13 of each support arm 11 has a hook element 17,18 of plastics material secured to it at either end by bolts so that the hook cavities of the two hook elements 17 and 18 face each other.

Figure 2:
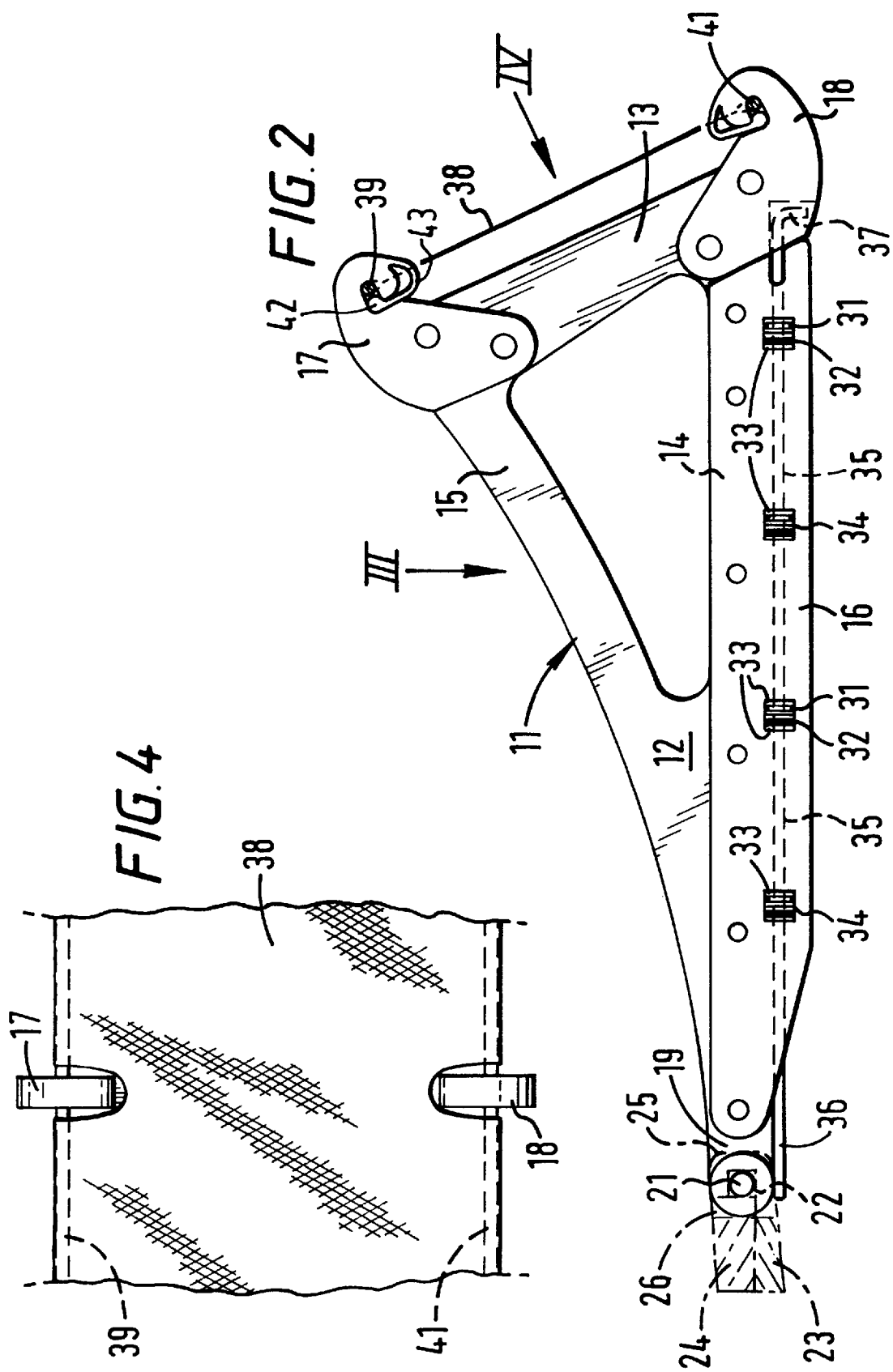
FIG. 2 is a section on the line II—II of FIG. 1, showing a support arm in elevation with part of the drogue parachute to which it is to be fitted.

Each support arm 11 is pivotally mounted in the region of its apex 19 which is formed by the two longer sides 14 and 15, for swinging movement in a radial direction. Each support arm 11 is pivotally mounted on a pivot pin 21 which passes through a hole 22 in the frame 12 in the region of the apex 19. The pivot pins 21, which are arranged end to end in a ring, as can be seen in FIGS. 1 and 2, are trapped between inner and outer clamp rings 23 and 24. The inner clamp ring 23 is castellated around its outer surface at one end so that it forms a circumferential array of abutments 25 against which the pivot pins 21 are held by the outer clamp ring 24 which is fitted over the remainder of the inner clamp ring 23 which projects through the ring of pivot pins 21. The outer clamp ring 24, which tapers away from the support arms 11, has an annular array of slots 26 formed in its larger diameter end, each slot 26 being aligned with a respective one of the support arms 11. The slots 26 are also aligned with the spaces between the abutments 25 and each slot 26 and the space with which it is aligned allows for the swinging movement of the aligned support arm 11. The clamp rings 23 and 24 are bolted together with pivot pins 21 trapped between them. The pivot pins 21 are trapped between the clamp rings 23 and 24 in a manner which allows each support arm 11 to pivot independently of the others.

Each juxtaposed pair of support arms 11 is joined together by a net 27 which is joined to each of those support arms 11 at spaced intervals along the channel section member 16 of that support arm 11. The net 27 comprises a cord formatted in a laced pattern which comprises loops between knots 28. In effect it is one length of cord, arranged in a wave form and knotted at overlapping points to form pairs of opposed loops between each adjacent pair of knots 28. Each piece 31,32 of the cord that extends between each knot 28 is wound around a reel 33 whereby that reel 33 is entrapped in it. Each reel 33 comprises a ring which is flanged at either end so that it forms an annular channel which receives the cord material of the respective cord piece 31,32 that is wound therearound. There is an arcuate link which is formed integrally with the remainder of the reel 33 and which is joined at either end to a respective one of the flanges whereby to complete the perimeter of an aperture through which the cord wound around the reel 33 is passed.

The channel section member 11 and the longer side 14 of the frame 12 which is fitted into its channel, together form a series of rectangular apertures 34 at spaced intervals along the length of the channel section member 16. Adjacent apertures 34 are interconnected by respective passages 35 which are formed by the space between the base of the channel and the edge of the frame 12 received within the channel. Each aperture 34 accommodates a reel 33 of a respective loop of the net 27 on either side of the respective support arm 11. A pin 36 extends through the aligned passages 35 from end to end of the frame 12 so that it bridges the line of apertures 34 and is passed through the central aperture of each reel 33 in each aperture 34 whereby each reel 33 is retained within the respective aperture 34 and the nets 27 on either side of each support arm 11 are connected to that support arm 11. The pin 36 has a hooked end 37 (see FIG. 3) which is fitted into an alcove in the hook element 18 at the adjacent end of the short side 13 so that it is entrapped therein, the alcove having a slot-shaped mouth through which the pin 36 projects.

Figure 3:
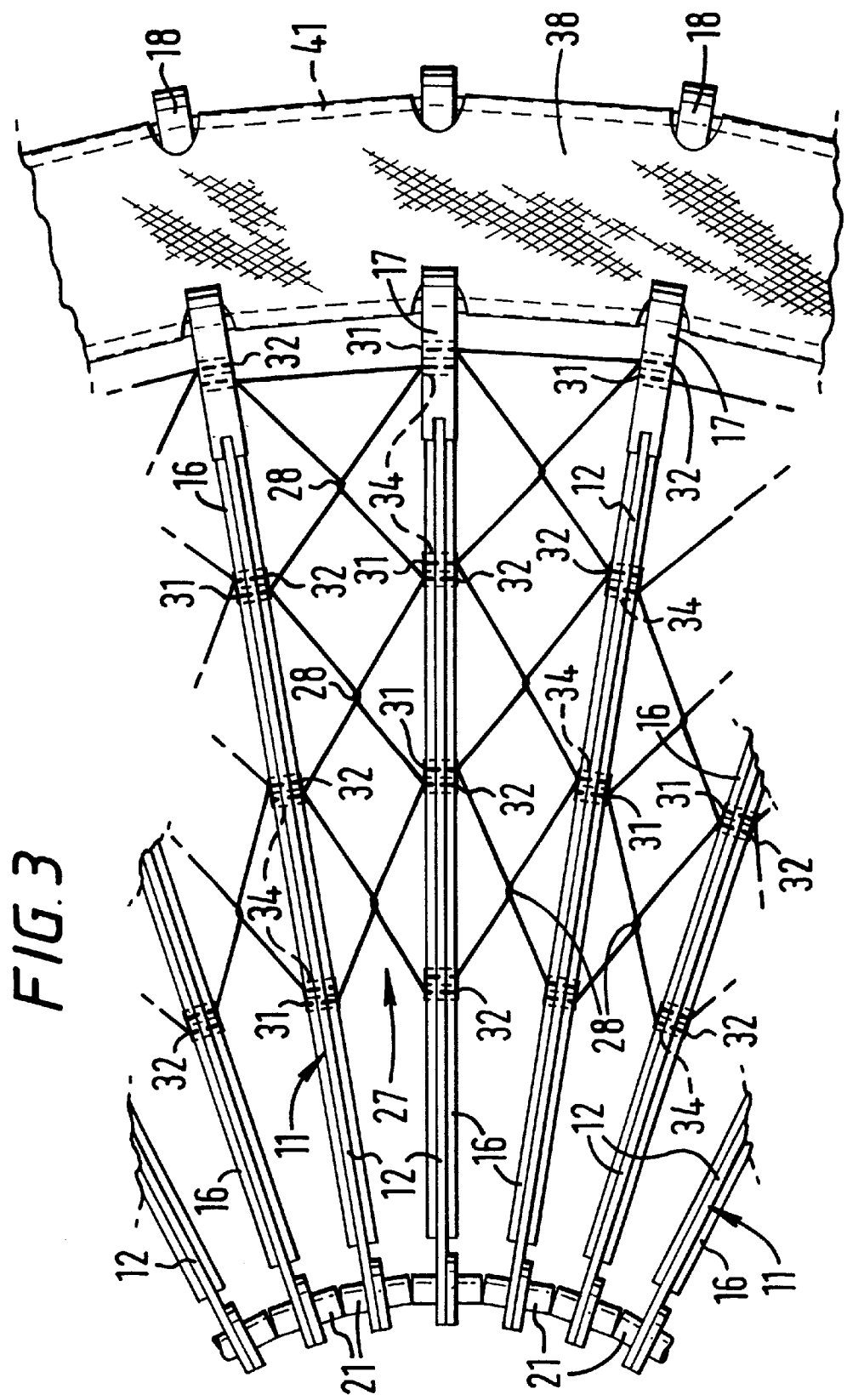
FIG. 3 is a view on arrow III in FIG. 2 of a fragment of the drogue assembly.

FIG. 1 shows that the support arms 11 carry a drogue parachute 38 which extends circumferentially around their short sides 13. The drogue parachute 38 comprises a circumferentially continuous strip of fabric which is reinforced along each of its axially-spaced peripheral edges by a respective fabric cord hoop 39,41. FIGS. 3 and 4 shows that the fabric of the drogue parachute 38 is cut away in the region of each hook element 17,18 to expose the respective hoop 39,41 which is received in the hook cavity of that hook element 17,18. There is sufficient clearance at the mouth of the hook cavity for the hoop 39,41 to be passed through it during assembly. Each hoop 39,41 is retained in the respective hook cavity by an enlarged end 42 of a strap element 43 which is fitted into the hook cavity between the hoop 39,41 and the mouth of the hook cavity and which is too large to be passed through the mouth of the hook cavity. The enlarged end 42 was inserted into the hook cavity from one side thereof and is a sliding fit therein. The remainder of the strap element 43 extends from the enlarged end 42 through the mouth of the hook cavity and around the outer surface of the respective hook element 17,18 to which it is joined. The strap element 43, including its enlarged end 42, is integral with the respective hook element 17,18, the whole being a moulding of plastics material.

We claim:

1. In a drogue assembly for in-flight refueling comprising a circumferential array of pivotally-mounted support arms concentric with an axis, each of the support arms extending in an axial direction generally parallel to said axis and having a pivot mounting for movement in a radial direction with respect to said axis, and a drogue parachute fitted to the support arms, the assembly being such that the support arms with the drogue parachute thereon can be collapsed within a cylindrical envelope having a diameter substantially that of the pivot mountings of the array, whereas when the drogue assembly is towed by an aircraft in flight, it is extended in the manner of a parachute with the support arms flared outwardly from the axis, trailing the pivot mountings, the improvement comprising a net for joining together each adjacent pair of support arms.

2. A drogue assembly according to claim 1, wherein each net is connected to a respective support arm by joints spaced at intervals along the respective support arm.

3. A drogue assembly according to claim 2, wherein each joint comprises a loop of the net material, the loop being retained within a respective one of spaced apertures in the support arm.

4. A drogue assembly according to claim 3, wherein the apertures are aligned in a row, adjacent apertures being interconnected by respective elongate aligned passages, and the loops are retained within the respective apertures by a common pin inserted into the aligned passages, the pin bridging each of the apertures wherein it is threaded through a respective loop to join the net to the support arm.

5. A drogue assembly according to claim 4, wherein each loop of net material is wound circumferentially around a reel through which the pin extends, the reel being secured to the net by the respective wound loop.

6. A drogue assembly according to claim 5, wherein the reel is flanged at both ends to form an annular channel to receive the net material wound around the reel.

7. A drogue assembly according to claim 6, including an arcuate link formed integrally with the reel and joined at either end to a respective one of the flanges to form with the flanges an aperture through which the wound net material is passed.

8. A drogue assembly according to claim 1, wherein each support arm is provided with a pair of hook elements at an end thereof remote from the pivot mounting, the hook elements being spaced apart in the direction of radial movement of the support arms, each hook element facing the other and receiving a respective edge portion of the drogue parachute and having retaining means fitted therein for retaining the respective edge portion, whereby the drogue parachute is fitted to the circumferential array of support arms.

9. A drogue assembly according to claim 8, wherein the retaining means comprise a strap element enlarged at its free end and joined to the outer surface of the respective hook element, the enlarged end making a sliding fit within the hook cavity.

* * * * *